Oct. 14, 1924.

D. S. BACON

APPLIANCE FOR REGULATING TEETH

Filed March 17, 1923

1,511,712

Inventor
DEXTER S. BACON

By Paul, Paul & Moore
ATTORNEYS

Patented Oct. 14, 1924.

1,511,712

UNITED STATES PATENT OFFICE.

DEXTER S. BACON, OF MINNEAPOLIS, MINNESOTA.

APPLIANCE FOR REGULATING TEETH.

Application filed March 17, 1923. Serial No. 625,860.

*To all whom it may concern:*

Be it known that I, DEXTER S. BACON, a citizen of the United States, resident of Minneapolis, county of Hennepin, and State of Minnesota, have invented certain new and useful Improvements in Appliances for Regulating Teeth, of which the following is a specification.

This invention relates to new and useful improvements in appliances to be secured to teeth for the purpose of regulating irregular teeth and constitutes an improvement upon the subject-matter of applicant's prior United States Patent No. 1,130,242, granted March 2, 1915.

The object of this device is to provide an improved appliance for regulating teeth, and a more specific object is to provide such an appliance which is removable and is provided with a plurality of portions adapted to grip an individual tooth.

Other objects of the invention will more fully appear from the following description and the accompanying drawings, and will be pointed out in the annexed claims.

In the accompanying drawings, there is disclosed a structure designed to carry out the objects of the invention but it is to be understood that the invention is not confined to the exact features shown as various changes may be made within the scope of the claims which follow.

Figure 1:
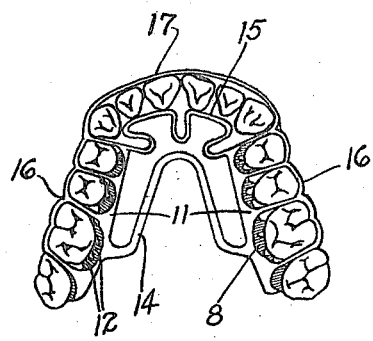
Figure 1 is a plan view showing the positioned appliance.

As is set forth in applicant's prior patent, a tension member, preferably in the form of an arched spring, is arranged between the side members of the device. This arched spring member may be given any desired tension and the tension can be increased each time the device is removed, and applied. By this means the teeth may be spread apart so as to bring them into the desired position in the jaw. The appliance is preferably constructed of sheet metal and includes one or more plates 8 bent or curved so as to conform to the surface of the tooth adjacent the portion covered by the gum 9. These plates are carried by the side members upon either side of the spring member. Each plate projects toward the root of a tooth so that its thin free edge may extend below the free margin of the gum at the inner side of the tooth and bear against the tooth below the usual bulge thereof. Each plate 8 is preferably carried by a side member such as a bar 11 which is preferably cast integrally therewith. The bar extends lengthwise of the jaw and is preferably of a length to extend substantially opposite three teeth. As is shown in the drawings, each plate 8 preferably of German silver, has a curve or scallop imparted thereto so that each plate will tend to conform to the contour of a tooth and adapt it to fit under, or partially under, the bulge of the tooth.

In this novel appliance, the free edge of each plate 8 is provided with a plurality of gripping portions. This may be conveniently effected by notching such plate edge or giving such free edge a serrated form. As is shown in the drawings, such notching or serrating provides a plurality of gripping portions 12. This notching or serrating of the free edge of the plate greatly facilitates the complete adaptation of this portion of the appliance and tends to eliminate a possible source of gum irritation due to an imperfect fit of the appliance at the neck of the tooth. Furthermore, this additional accuracy and completeness of adaptation results in a more positive retention of the appliance in the mouth and aids in slight rotations of the teeth. The provision of individual gripping portions upon each plate permits a greater force to be exerted upon one side of the tooth than another so that force may be accurately directed to effect partial tooth-rotation where desired.

Figures 2, 3:
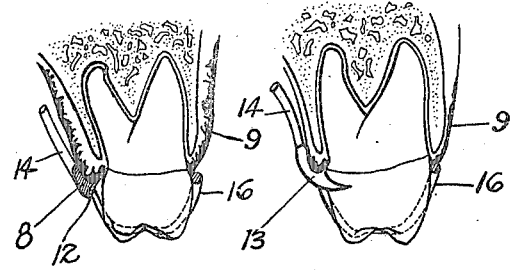
Figure 2 is a view in side elevation of a tooth and showing the gum and a portion of the positioned appliance in vertical section.
Figure 3 is a view similar to that of Figure 2 and showing a slightly modfied form.
Figure 4:
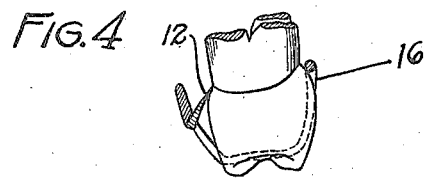
Figure 4 is a view in side elevation of a tooth and a portion of its roots with the positioned device shown in vertical section.
Figure 5:
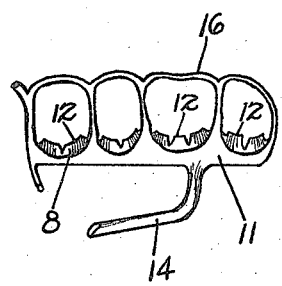
Figure 5 is a plan view of a portion of the appliance to show the serrated form of gripping portion.
Figure 6:
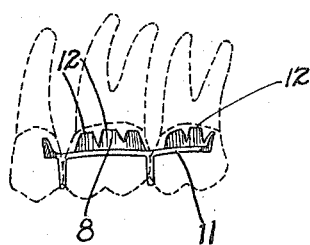
Figure 6 is a view in side elevation of a part of the appliance with the relative position of several teeth shown in dotted lines.
Figure 7:
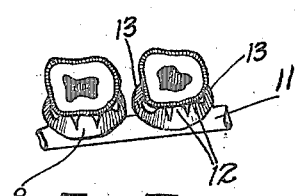
Figure 7 is a cross sectional view through two adjacent teeth with a portion of the positioned appliance, and showing the modified form illustrated in Figure 3.

In certain corrective cases, it is advantageous that this plate or subgingival extension of the appliance be so constructed as to have a portion extending a relatively slight distance around a tooth and into the space between adjacent teeth. Such form of this novel appliance is shown in Figures 3 and 7. Therein, the plate 8 is shown with relatively long gripping portions 13 terminally provided upon each side of a plate 8. In Figure 7, these relatively elongated portions 13 are shown extending into the space between two adjacent teeth.

In each of the forms, the plate 8 presses back the free margin of the gum a sufficient distance to cause the serrated thin edge of the plate to come under the bulge of the tooth even when the tooth is only partially erupted.

The bar 11 is preferably made of light and strong material and a large portion of the plate 8 is cast integrally therewith so that the whole forms a very firm appliance by which pressure may be applied to the teeth just below the bulge thereof.

An arched spring member 14 is connected, preferably integrally, to the bars adjacent their rear portions and the spring member forwardly extends with its major portions generally parallel to the line of the teeth. The forward ends of the two opposed bars terminate in a metallic spring element 15 as is shown in Figure 1. The spring element is adapted to engage the inner surfaces of the front teeth and to apply pressure thereto. A series of metallic loops 16 are connected to the bar 11 and are adapted to encircle the teeth to which they are applied, while the gripping portions of the plates engage the teeth adjacent the bulges thereof. An additional forward spring loop 17 is connected to the loops 16 and extends around the outside of the forward teeth.

Having thus described my invention, what I claim as new and desire to secure by Letters-Patent, is:

1. An appliance for regulating teeth comprising a pair of oppositely arranged plates shaped to conform substantially to the inner surfaces of the teeth, a plurality of individual gripping portions on its plate adapted to engage the teeth, a spring member connecting the forward edges of the two plates and shaped to engage the inner surfaces of the front teeth to apply pressure thereto, and an arched spring member connecting the rear portions of the plates and extending freely forward with its major portions generally parallel to the line of the teeth.

2. An appliance for regulating teeth comprising a pair of oppositely arranged plates shaped to conform substantially to the inner surfaces of the teeth, each plate having a relatively thin serrated gripping edge adapted to engage a tooth below the free edge of the gum, and tension means connected to the plates and tending to force the teeth to regulated predetermined positions.

3. An appliance for regulating teeth comprising a pair of oppositely arranged plates shaped to conform substantially to the inner surfaces of the teeth, each plate having a relatively thin gripping edge adapted to engage a tooth below the free edge of the gum, tension means connected to the plates and tending to force the teeth to regulated predetermined positions, one of said plates having its gripping edge provided with oppositely projecting portions adapted to extend partially around a tooth and into the space between the adjacent teeth and to engage said tooth whereby partial tooth-rotation may be effected.

In witness whereof, I have hereunto set my hand this 14th day of March 1923.

DEXTER S. BACON.